(12) United States Patent
Rabinovich et al.

(10) Patent No.: US 7,333,891 B2
(45) Date of Patent: Feb. 19, 2008

(54) CORRECTION OF CROSS-COMPONENT INDUCTION MEASUREMENTS FOR MISALIGNMENT USING COMPARISON OF THE XY FORMATION RESPONSE

(75) Inventors: Michael B. Rabinovich, Houston, TX (US); Leonty A. Tabarovsky, Cypress, TX (US); Bill H. Corley, Conroe, TX (US); Luis M. Pelegri, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/400,536

(22) Filed: Apr. 6, 2006

(65) Prior Publication Data

US 2007/0239360 A1   Oct. 11, 2007

(51) Int. Cl.
*G01V 3/28* (2006.01)
(52) U.S. Cl. .......................................................... 702/7
(58) Field of Classification Search .................... 702/7, 702/9, 10, 11, 12, 13
See application file for complete search history.

(56) References Cited

U.S. PATENT DOCUMENTS

| | | | |
|---|---|---|---|
| 4,302,722 A | 11/1981 | Gianzero | 324/339 |
| 4,837,517 A | 6/1989 | Barber | 324/339 |
| 5,157,605 A | 10/1992 | Chandler et al. | 364/422 |
| 5,452,761 A | 9/1995 | Beard et al. | 166/250 |
| 5,600,246 A | 2/1997 | Forgang et al. | 324/339 |
| 5,781,436 A | 7/1998 | Forgang et al. | 364/422 |
| 5,884,227 A | 3/1999 | Rabinovich et al. | 702/7 |
| 5,999,883 A | 12/1999 | Gupta et al. | 702/7 |
| 6,470,274 B1 | 10/2002 | Mollison et al. | 702/7 |
| 6,636,045 B2 | 10/2003 | Tabarovsky et al. | 324/343 |
| 6,643,589 B2 | 11/2003 | Zhang et al. | 702/7 |
| 6,885,947 B2 | 4/2005 | Xiao et al. | 702/17 |
| 2005/0030037 A1 | 2/2005 | Fanini et al. | 324/339 |
| 2006/0164092 A1 | 7/2006 | Forgang et al. | 324/339 |
| 2006/0208737 A1 | 9/2006 | Merchant et al. | 324/330 |

FOREIGN PATENT DOCUMENTS

WO   WO9800733   1/1998

OTHER PUBLICATIONS

Moran et al.; *Basic Theory of Induction Logging and Application to Study of Two-Coil Sondes*, Society of Exploration Geophysicists, vol. 27, No. 6, Dec. 1962, pp. 829-858.

*Primary Examiner*—Donald E McElheny, Jr.
(74) *Attorney, Agent, or Firm*—Madan, Mossman & Sriram, P.C.

(57) ABSTRACT

Measurements are made with a multicomponent logging tool in an earth formation. The measurements are inverted without using a selected cross-component measurement. The model is then used to predict the value of the selected cross-component. A misalignment angle of the tool is estimated from the predicted and actual values of the selected cross-component.

22 Claims, 4 Drawing Sheets

CORRECTION OF CROSS-COMPONENT INDUCTION MEASUREMENTS FOR MISALIGNMENT USING COMPARISON OF THE XY FORMATION RESPONSE

CROSS-REFERENCES TO RELATED APPLICATIONS

This application is related to U.S. patent application Ser. No. 11/398,838 to Rabinovich et al., filed Apr. 6, 2006 and U.S. patent application Ser. No. 11/400,097 to Rabinovich et al., filed Apr. 6, 2006.

BACKGROUND OF THE INVENTION

1. Field of the Invention

The present invention is related to the field of apparatus design in the field of oil exploration. In particular, the present invention describes a method for calibrating multi-component logging devices used for detecting the presence of oil in boreholes penetrating a geological formation.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 to Barber, in U.S. Pat. No. 5,157,605 to Chandler et al., and in U.S. Pat. No. 5,600,246 to Fanini et al.

The conventional geophysical induction resistivity well logging tool is a probe suitable for lowering into the borehole and it comprises a sensor section containing a transmitter antenna and a receiver antenna and other, primarily electrical, equipment for measuring data to infer the physical parameters that characterize the formation. The sensor section, or mandrel, comprises induction transmitters and receivers positioned along the instrument axis, arranged in the order according to particular instrument or tool specifications and oriented parallel with the borehole axis. The electrical equipment generates an electrical voltage to be further applied to a transmitter induction coil, conditions signals coming from receiver induction coils, processes the acquired information, stores the data or, by means of telemetry sends the data to the earth surface through a wire line cable used to lower the tool into the borehole.

In general, when using a conventional induction logging tool with transmitters and receivers (induction coils) oriented only along the borehole axis, the hydrocarbon-bearing zones are difficult to detect when they occur in multi-layered or laminated reservoirs. These reservoirs usually consist of thin alternating layers of shale and sand and, oftentimes, the layers are so thin that due to the insufficient resolution of the conventional logging tool they cannot be detected individually. In this case the average conductivity of the formation is evaluated.

Conventional induction well logging techniques employ coils wound on an insulating mandrel. One or more transmitter coils are energized by an alternating current. The oscillating magnetic field produced by this arrangement results in the induction of currents in the formations that are nearly proportional to the conductivity of the formations. These currents, in turn, contribute to the voltage induced in one or more receiver coils. By selecting only the voltage component that is in phase with the transmitter current, a signal is obtained that is approximately proportional to the formation conductivity. In conventional induction logging apparatus, the basic transmitter coil and receiver coil have axes that are aligned with the longitudinal axis of the well logging device. (For simplicity of explanation, it will be assumed that the bore hole axis is aligned with the axis of the logging device, and that these are both in the vertical direction. Also single coils will subsequently be referred to without regard for focusing coils or the like.) This arrangement tends to induce secondary current loops in the formations that are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction perpendicular to the bedding plane. When there is no bedding dip, horizontal resistivity can be considered to be in the plane perpendicular to the bore hole, and the vertical resistivity in the direction parallel to the bore hole. Conventional induction logging devices, which tend to be sensitive only to the horizontal conductivity of the formations, do not provide a measure of vertical conductivity or of anisotropy. Techniques have been developed to determine formation anisotropy. See, e.g. U.S. Pat. No. 4,302,722 to Gianzero et al. Transverse anisotropy often occurs such that variations in resistivity occur in the azimuthal direction.

Thus, in a vertical borehole, a conventional induction logging tool with transmitters and receivers (induction coils) oriented only along the borehole axis responds to the average horizontal conductivity that combines the conductivity of both sand and shale. These average readings are usually dominated by the relatively higher conductivity of the shale layers and exhibit reduced sensitivity to the lower conductivity sand layers where hydrocarbon reserves are produced. To address this problem, loggers have turned to using transverse induction logging tools having magnetic transmitters and receivers (induction coils) oriented transversely with respect to the tool longitudinal axis. Such instruments for transverse induction well logging have been described in PCT Patent publication WO 98/00733 of Beard et al. and U.S. Pat. No. 5,452,761 to Beard et al.; U.S. Pat. No. 5,999,883 to Gupta et al.; and U.S. Pat. No. 5,781,436 to Forgang et al.

One, if not the main, difficulty in interpreting the data acquired by a transversal induction logging tool is associated with vulnerability of its response to borehole conditions. Among these conditions is the presence of a conductive well fluid as well as wellbore fluid invasion effects.

In the induction logging instruments, the acquired data quality depends on the formation electromagnetic parameter distribution (conductivity) in which the tool induction receivers operate. Thus, in the ideal case, the logging tool measures magnetic signals induced by eddy currents flowing in the formation. Variations in the magnitude and phase of the eddy currents occurring in response to variations in the formation conductivity are reflected as respective variations in the output voltage of receivers. In the conventional induction instruments, these receiver induction coil voltages are conditioned and then processed using analog phase sensitive detectors or digitized by digital-to-analog converters and then processed with signal processing algorithms. The processing allows for determining both receiver voltage amplitude and phase with respect to the induction transmitter current or magnetic field waveform. It has been found convenient for further uphole geophysical interpretation to deliver the processed receiver signal as a vector combination of two voltage components: one being in-phase with transmitter waveform and another out-of-phase, quadrature component. Theoretically, the in-phase coil voltage component amplitude is the more sensitive and noise-free indicator of the formation conductivity.

Recognizing the fact that no hardware calibration is perfect, and may further be susceptible to changes over time, the present invention provides methods for calibration of multicomponent induction logging instruments in the presence of possible hardware errors and misalignments.

SUMMARY OF THE INVENTION

One embodiment of the invention is a method of estimating a parameter of interest of an earth formation. A logging tool is conveyed into a borehole in the earth formation. Multi-component measurements resistivity measurements are obtained using the logging tool. The multi-component measurements are inverted without using a particular cross-component to give a resistivity model. The resistivity model is used to provide a simulated value of the particular cross-component. The simulated value and the actual value of the particular cross-component are used for estimating a misalignment angle in the logging tool.

Another embodiment of the invention is an apparatus for estimating a parameter of interest of an earth formation. A logging tool obtains a plurality of multi-component resistivity measurements. A processor inverts the multi-component measurements while excluding a particular cross-component to give a resistivity model. The processor then uses the resistivity model to provide a simulated value of the particular cross-component. The processor than uses the simulated value and the actual value of the particular cross-component to estimate a misalignment angle in the logging tool.

Another embodiment of the invention is a computer readable medium for use with an apparatus for estimating a parameter of interest of an earth formation. The apparatus includes a logging tool which obtains a plurality of multi-component resistivity measurements. The instructions enable a processor to invert the multi-component measurements while excluding a particular cross-component to give a resistivity model. The instructions further enable the processor to use the resistivity model to provide a simulated value of the particular cross-component. The instructions then enable the processor to use the simulated value and the actual value of the particular cross-component to estimate a misalignment angle in the logging tool.

BRIEF DESCRIPTION OF THE DRAWINGS

The present invention is best understood with reference to the accompanying figures in which like numerals refer to like elements and in which.

DETAILED DESCRIPTION OF THE INVENTION

The instrument structure provided by the present invention enables increased stability and accuracy in an induction wellbore logging tool and its operational capabilities, which, in turn, results in better quality and utility of wellbore data acquired during logging. The features of the present invention are applicable to improve the accuracy of a transverse induction tool.

Figure 1:
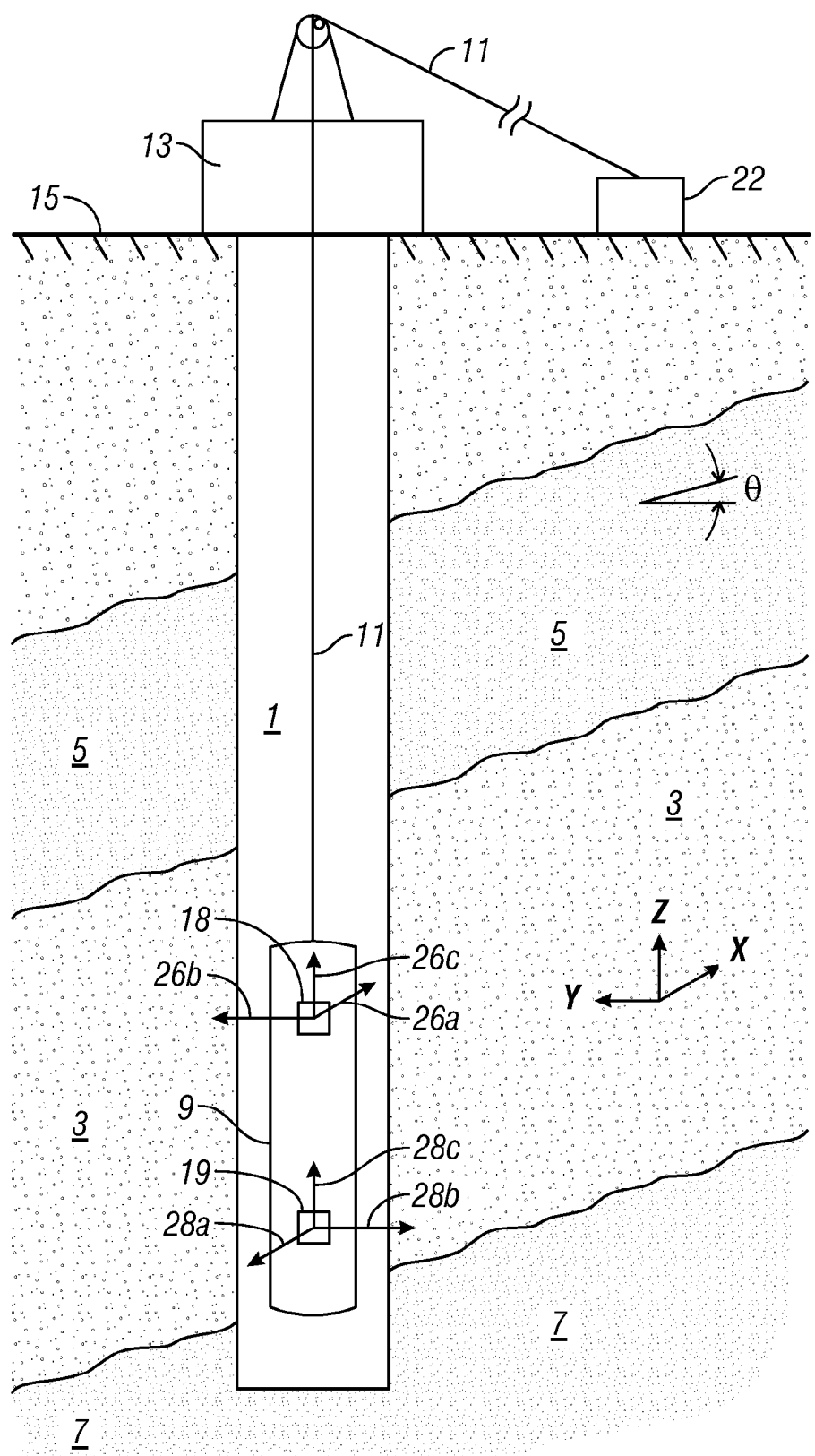
FIG. 1 shows schematically a wellbore extending into a laminated earth formation, into which wellbore an induction logging tool as used according to the invention has been lowered.

The invention will now be described in more detail, and by way of example, with reference to the accompanying drawings. FIG. 1 schematically shows a wellbore 1 extending into a laminated earth formation, into which wellbore an induction logging tool 9 as used according to the present invention has been lowered. The wellbore in FIG. 1 extends into an earth formation that includes a hydrocarbon-bearing sand layer 3 located between an upper shale layer 5 and a lower shale layer 7, both having higher conductivity than the hydrocarbon bearing sand layer 3. An induction logging tool 9 used in the practice of the invention has been lowered into the wellbore 1 via a wireline 11 extending through a blowout preventor 13 (shown schematically) located at the earth surface 15. The surface equipment 22 includes an electric power supply to provide electric power to the set of coils 18 and a signal processor to receive and process electric signals from the receiver coils 19. Alternatively, the power supply and/or signal processors are located in the logging tool. It is to be noted that the term "coil" is intended to include antennas made of non-circular conductors as well as conductor arrangements (including rectangular configurations) limited to a plane that are commonly used to transmit and receive electromagnetic energy.

The relative orientation of the wellbore 1 and the logging tool 9 with respect to the layers 3, 5, 7 is determined by two angles, one of which θ as shown in the FIG. 1. For determination of these angles see, for example, U.S. Pat. No. 5,999,883 to Gupta, et al. The logging tool 9 is provided with a set of transmitter coils 18 and a set of receiver coils 19, each set of coils 18, 19 being connected to surface equipment 22 via suitable conductors (not shown) extending along the wireline 11.

Each set of coils 18 and 19 includes three coils (not shown), which are arranged such that the set has three magnetic dipole moments in mutually orthogonal directions, that is, in x, y and z directions. The three-coil transmitter coil set transmits $T_x$, $T_y$ and $T_z$. The receiver coil receives $R_x$, $R_y$ and $R_z$ plus the cross-components, $R_{xy}$, $R_{xz}$ and $R_{zy}$. Thus, coil set 18 has magnetic dipole moments 26a, 26b, 26c, and coil set 19 has magnetic dipole moments 28a, 28b, 28c. In one embodiment, the transmitter coil set 18 is electrically isolated from the receiver coil set 19 The apparatus and method using a wireline is not intended to be a limitation of the invention, it being possible to practice the invention with a logging tool on a bottomhole assembly (BHA) conveyed on a drilling tubular. For the purposes of the present invention, the BHA and the assembly described in FIG. 1 may be referred to as a downhole assembly.

Figure 2:
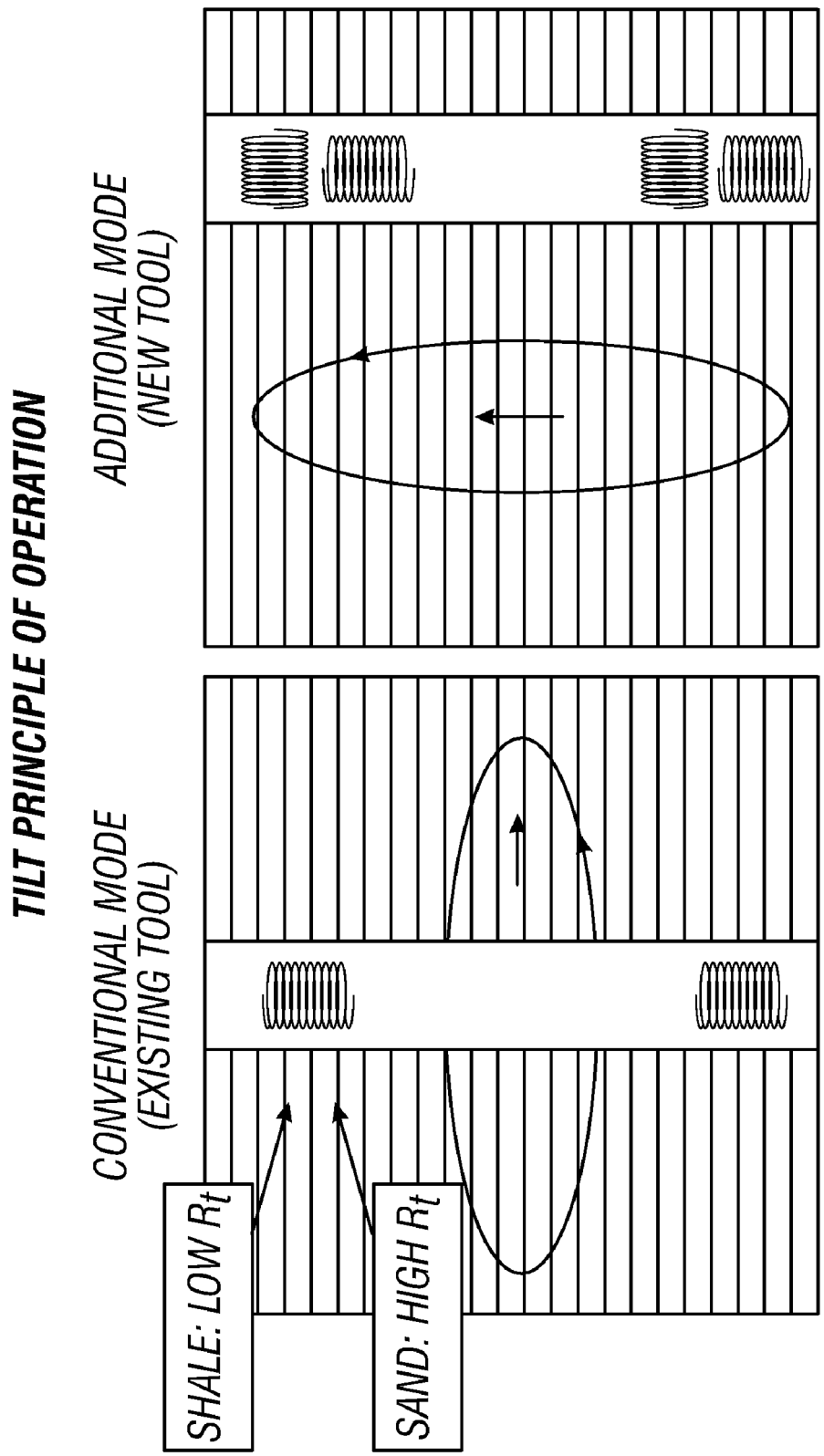
FIG. 2A (prior art) illustrates a conventional resistivity measurement in the vertical direction.
FIG. 2B (prior art) illustrates a resistivity measurement in the horizontal direction.

As shown in FIG. 2A, conventional induction logging tools provide a single transmitter coil and a receiver coil that measure resistivity in the horizontal direction. In the conventional horizontal mode, as shown in FIG. 2A, the resistivities of adjacent high resistivity sand and low resistivity shale layers appear in parallel, thus the resistivity measurement is dominated by low resistivity shale. As shown in FIGS. 1 and 2B, in the present invention a transverse coil is added to measure resistivity in the vertical direction. In the vertical direction, the resistivity of the highly resistive sand and low resistivity shale are appear in series and thus the vertical series resistivity measurement is dominated by the resistivity of the highly resistive sand.

For ease of reference, normal operation of the tool 9, as shown in FIGS. 1 and 2B, will be described hereinafter only for the coils having dipole moments in the x-direction, i.e. dipole moments 26a and 28a. During normal operation an alternating current of a frequency $f_1$ is supplied by the electric power supply of surface equipment 22 to transmitter coil set 18 so that a magnetic field with magnetic dipole moment 26a is induced in the formation. In an alternative embodiment, the frequency is swept through a range $f_1$ through $f_2$. This magnetic field extends into the sand layer 3 and induces a number of local eddy currents in the sand layer 3. The magnitude of the local eddy currents is dependent upon their location relative to the transmitter coil set 18, the conductivity of the earth formation at each location, and the frequency at which the transmitter coil set 18 is operating. In principle, the local eddy currents act as a source inducing new currents, which again induce further new currents, and so on. The currents induced into the sand layer 3 induce a response magnetic field in the formation, which response magnetic field is not in phase with the transmitted magnetic field, but which induces a response current in receiver coil set 19. The magnitude of the current induced in the sand layer 3 depends on the conductivity of the sand layer 3 and affects the magnitude of the response current in receiver coil set 19. The magnitude of the response current in receiver coil 19 also depends on the conductivity of sand layer 3 and thereby provides an indication of the conductivity of the sand layer 3. However, the magnetic field generated by transmitter coil set 18 not only extends into sand layer 3, but also into the wellbore fluid and into the shale layers 5 and 7 so that currents in the wellbore fluid and the shale layers 5 and 7 are induced.

Let us consider $H_{XY}$ measurement, where X is orientation of the transmitter and Y is the orientation of the receiver. This notation where the first subscript refers to the transmitter orientation and the second to the receiver orientation will be used throughout the present disclosure. We assume that if the coils are properly aligned (exactly 90° between X and Y coils) the response from the formation will be $H_{XYtrue}$. If the Y receiver is misaligned with the X transmitter by the angle α, then the magnetic field $H_{XY}$ measured in such array is $$H_{XY}=H_{XYtrue}\cdot\cos\alpha+H_{XYtrue}\cdot\sin\alpha \quad (1).$$

The angle α is considered to be positive if the angle between the X and Y coils is less than 90°. Those skilled in the art having the benefit of the present disclosure would recognize that the misalignment angle could change over time for wireline measurements and MWD applications.

Figure 3:
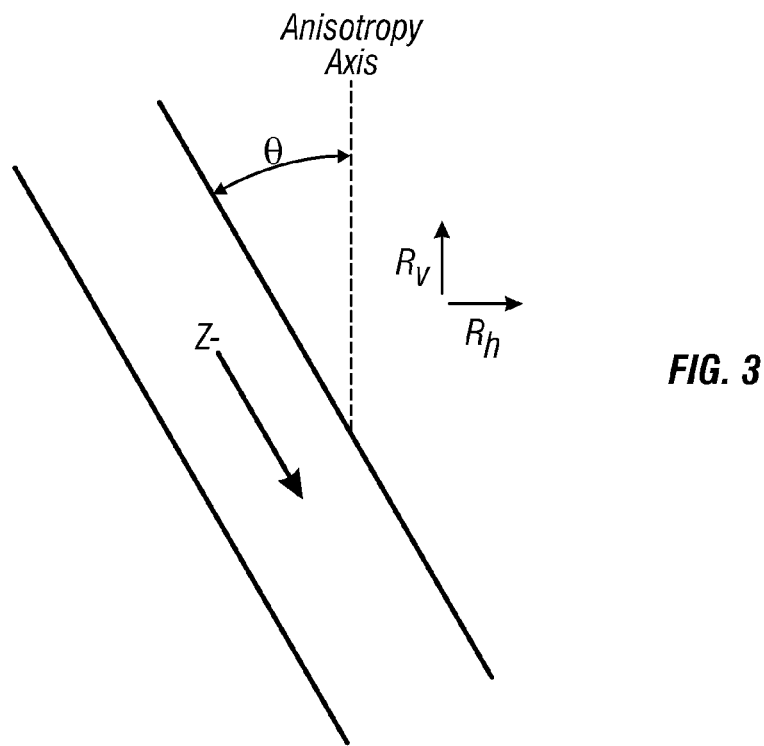
FIG. 3 shows a borehole inclined to a bedding plane.

A simple example shows that even when the misalignment angle α is small (typically 1-5°) there are quite a few cases where the misalignment error becomes comparable with the true Hxy response. In the example, $R_h$, the horizontal resistivity in a direction normal to the anisotropy axis is taken as 0.5 Ω-.m; $R_v$, the vertical resistivity (in a direction parallel to the anisotropy axis) is taken as 2 Ω-.m; the relative dip angle θ (see FIG. 3) between the tool axis and the anisotropy axis is 20°. For a relative toolface rotation of 45° and a frequency of 83.3 kHz, the true response (real voltage converted to apparent conductivities) for the XX component is −524.3 mS/m and for the XY component is 25.4 mS/m.

For a misalignment angle of 3°, the measured XY signal will be $$\sigma_{XYmeasured}=25.4\text{ mS/m}\cdot\cos 3°-524.3\text{ mS/m}\cdot\sin 3°=-2.1\text{ mS/m}$$

We can see that in this case the misalignment error exceeds 100%, having changed by an amount of about 27.5 mS/m. If the misalignment angle α is known, Eqn. 1 can be used for correcting the measured XY signal. Unfortunately, the misalignment angle α cannot be measured in advance because it can change during pre-logging tool string assembly and also while logging due to twisting and bending effects.

In one embodiment of the invention, the misalignment angle α is estimated and the measurements are corrected using a multi-frequency quadrature signal. The 3DEX tool has a 3-coil configurations (two transmitter and one receiver coils) for cross-components that are not mutually balanced. The main reason for mutually balanced multi-coil arrays in induction measurements (including main components of the 3DEX tool) is compensation of the direct field in quadrature components. This direct field is large compared to the formation response, so if it is not compensated and the phase detection is not accurate enough, it will propagate in the real voltage and cause undesired distortion. For cross-components measurements, the mutual balancing is not as important because the direct field of the X transmitter does not contribute into the Y receiver due to orthogonality. But if the X and Y coils are misaligned, the direct field from unbalanced X transmitters does contribute to the Y quadrature signal. The misalignment angle α is estimated based on the amplitude of this signal.

Eqn. (1) is used to analyze the misaligned XY quadrature signal. The response consists of the cosine projection of true XY formation quadrature signal and the sine projection of true XX signal. The true XX signal is dominated by the direct field, which is frequency and formation independent. If we extract the constant part of the XY quadrature signal and compare it with the total direct field, we will be able to find the misalignment angle. For example, let us consider the 3DEX response in the following model:

$R_h$=1 Ω-m;
$R_v$=4 Ω-m;
Relative dip=45°;
Relative rotation=45°;
Frequency=20.83 kHz.

The values of the XY quadrature formation response and the direct field for a 2° misalignment for this model are presented in Table 1. It can be seen that in this case the formation response is comparable with the direct field, meaning that we have to separate the direct field from the formation response to accurately estimate the misalignment angle.

TABLE 1

Comparison of the XY formation response and the direct field caused by 2° misalignment

| XY formation response $Re(H_{xy})$ (Wb/m$^2$) | Direct field for 2° misalignment (Wb/m$^2$) | Formation relative contribution % |
|---|---|---|
| $0.0474 * 10^{-3}$ | $-0.0903 * 10^{-3}$ | 52.5 |

The separation of the direct field from the formation response in the quadrature signal may be achieved by applying the Taylor expansion used in multi-frequency focusing of the real signal. Using results from U.S. Pat. No. 5,884,227 to Rabinovich et al., the quadrature signal is given by the Taylor series expansion:

$$Re(H) = b_0 + b_1\omega^{3/2} + b_2\omega^2 + b_3\omega^{5/2} + b_4\omega^{7/2} + b_5\omega^4 + b_6\omega^{9/2} \quad (2)$$

The first term in this expansion is independent of frequency and represents the direct field. In the present invention, multi-frequency quadrature measurements are made and this first term is extracted using the Taylor series expansion. Typically, this is done using a multi-frequency focusing algorithm with the appropriate power series.

To test our invention, we generated synthetic data for two different models:

1. $R_h$=10 Ω-m; $R_v$=40 Ω-m, Relative dip=45°, Relative rotation=45°;

2. $R_h$=1 Ω-m; $R_v$=4 Ω-m, Relative dip=45°, Relative rotation=45°.

For each model we calculated responses for 5 different misalignment angles: 0, 1, 2, 3, 4, 5 degrees. The term "misalignment angle" when used with respect to coils that are nominally orthogonal to each other means a difference from 90° in alignment. For each misalignment angle we applied the above-described procedure to extract the direct field from the data, and based on this value, calculated the misalignment angle. The results for the both models are presented in the tables below.

TABLE 2

Calculation of the misalignment angle for the Model 1.

| True misalignment angle (deg) | Extracted direct field (Wb/m$^2$) | Total direct field (Wb/m$^2$) | Calculated misalignment angle (deg) |
|---|---|---|---|
| 5 | $-0.225 * 10^{-3}$ | $-0.2586 * 10^{-2}$ | 4.99 |
| 4 | $-0.180 * 10^{-3}$ | $-0.2586 * 10^{-2}$ | 3.99 |
| 3 | $-0.135 * 10^{-3}$ | $-0.2586 * 10^{-2}$ | 2.99 |
| 2 | $-0.902 * 10^{-4}$ | $-0.2586 * 10^{-2}$ | 1.999 |
| 1 | $-0.451 * 10^{-4}$ | $-0.2586 * 10^{-2}$ | 0.999 |
| 0 | $-0.450 * 10^{-6}$ | $-0.2586 * 10^{-2}$ | 0.01 |

TABLE 3

Calculation of the misalignment angle for the Model 2.

| True misalignment angle (deg) | Extracted direct field (Wb/m$^2$) | Total direct field (Wb/m$^2$) | Calculated misalignment angle (deg) |
|---|---|---|---|
| 5 | $-0.224 * 10^{-3}$ | $-0.2586 * 10^{-2}$ | 4.97 |
| 4 | $-0.179 * 10^{-3}$ | $-0.2586 * 10^{-2}$ | 3.97 |
| 3 | $-0.134 * 10^{-3}$ | $-0.2586 * 10^{-2}$ | 2.97 |
| 2 | $-0.885 * 10^{-4}$ | $-0.2586 * 10^{-2}$ | 1.96 |
| 1 | $-0.433 * 10^{-4}$ | $-0.2586 * 10^{-2}$ | 0.96 |
| 0 | $-0.188 * 10^{-5}$ | $-0.2586 * 10^{-2}$ | 0.04 |

Figure 4:
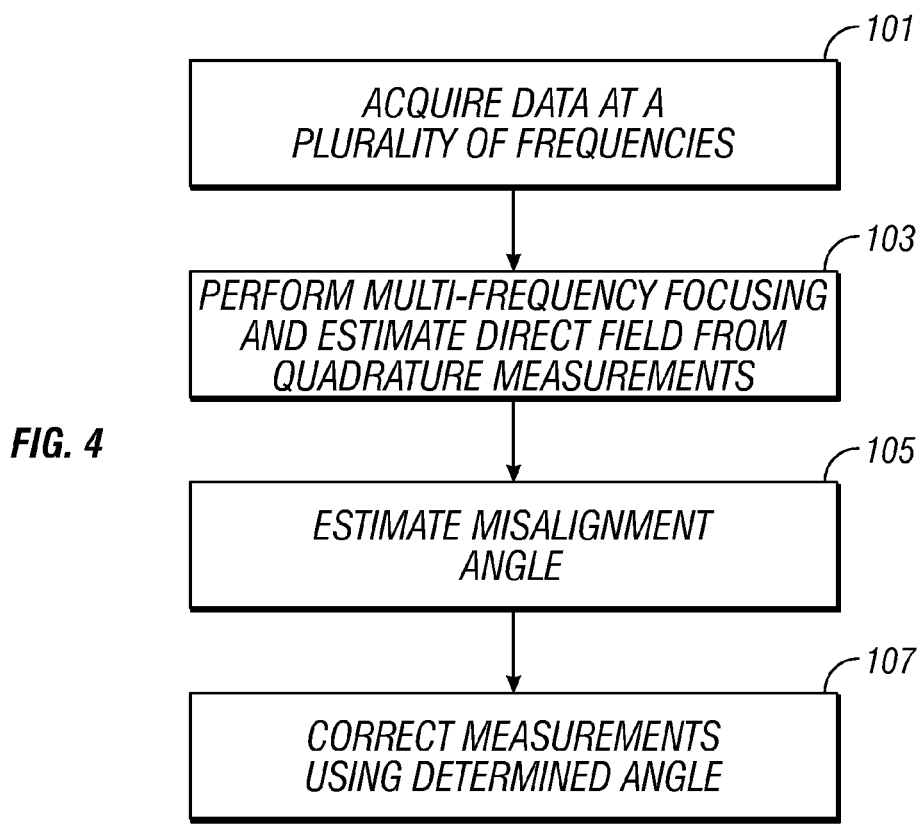
FIG. 4 shows a flow chart of one embodiment of the present invention using quadrature signals.

This embodiment of the invention may be represented by the flow chart of FIG. 4. Data are acquired at a plurality of frequencies 101. As a specific example, the transmitter is an X transmitter and the receiver is a Y receiver. A multi-frequency focusing of the quadrature magnetic signal is performed 103 using eqn. (2) to give the direct field between the transmitter and the receiver. This may also be done using an equivalent formulation for the electric field using methods known to those versed in the art having the benefit of the present disclosure. Using the estimated direct field, the misalignment angle is estimated 105. The estimated misalignment angle may then be used to correct the individual single frequency measurements, including the in-phase components 107. It should be noted that while the description above has been made with respect to the XY component, from reciprocity considerations, the method is equally valid for the YX component.

Once the misalignment angle is estimated, all of the multi-component signals can be corrected for misalignment and used for interpreting formation resistivities and petrophysical parameters. The principles used for this interpretation have been discussed, for example, in U.S. Pat. No. 6,470,274 to Mollison et al, U.S. Pat. No. 6,643,589 to Zhang et al., U.S. Pat. No. 6,636,045 to Tabarovsky et al., the contents of which are incorporated herein by reference. Specifically, the parameters estimated may include horizontal and vertical resistivities (or conductivities), relative dip angles, strike angles, sand and shale content, and water saturation.

The method described above is generally not applicable when a co-located transmitter coil array is used in conjunction with a co-located main receiver coil array and a co-located bucking receiver coil array. In such a situation, the main and bucking coils are decoupled and the misalignment is estimated separately for the main and bucking coils.

A second embodiment of the invention is based on recognition of the fact that for a given anisotropic formation with a particular relative dip, the XY cross-component response will change from a negative value at −45° relative rotation to a positive value of equal magnitude at 45° relative rotation. A zero-crossing will occur at 0° relative rotation. The actual magnitude of the positive and negative values will be dependent on the resistivity and the relative dip properties of the formation, but the response should always oscillate about zero for a perfectly aligned tool rotating in a uniform anisotropic formation.

If the X transmitters and the Y receiver are misaligned, a portion of the direct XX signal will be introduced into the XY response as described previously. If the tool is rotating through a uniform formation, the deviation of the oscillations away from zero allows this misalignment to be computed.

To apply the technique, a relatively uniform formation (typically a thick shale interval) is chosen for making measurements with the 3DEX tool. The tool is rotated within the borehole. For wireline applications, this may require an auxiliary motor for rotating the tool or may result from rotation of the wireline and the downhole assembly as it is conveyed through the borehole. For measurement-while-drilling (MWD) applications, the rotation is accomplished by the rotation of the bottomhole assembly (BHA) that carries the 3DEX tool. The average XY and XX responses across this formation are computed. Based on the eqn. (1) and the assumption that the average $\overline{H}_{XYtrue}$ should be zero, where the overbar represents an averaging, the misalignment angle may be computed using average responses.

$$H_{XY} = H_{XXtrue} \cdot \sin \alpha \quad (3)$$

This technique assumes that the misalignment is not changing and will not compensate for twisting and bending while logging unless the effect remains consistent. The estimation of bias in ZX measurements on a rotating drillstring has been discussed in U.S. patent application Ser. No. 11/299,053 of Chemali et al, having the same assignee as the present invention and the contents of which are incorporated herein by reference. Once the misalignment angle has been estimated, measurements may be corrected using eqn. (1).

Figure 5:
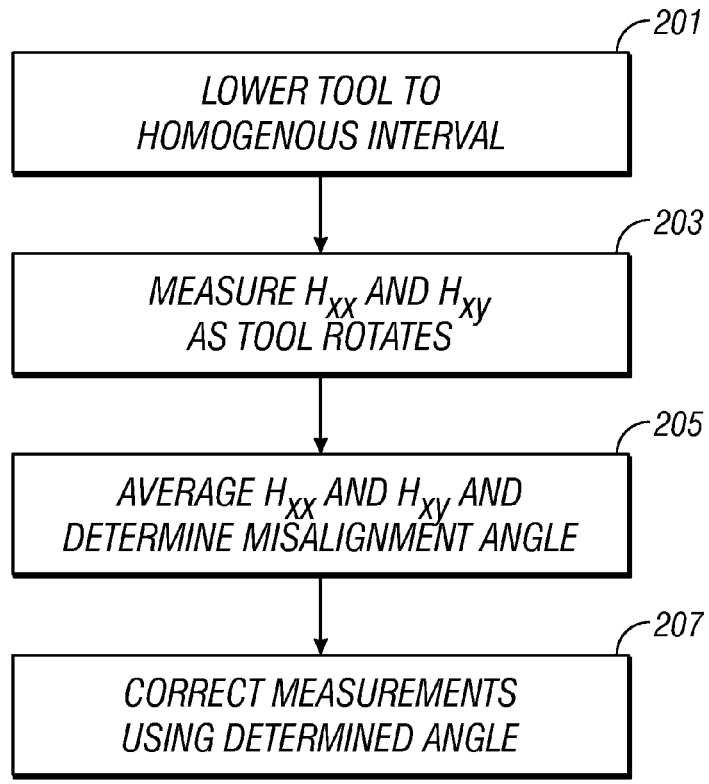
FIG. 5 shows a flow chart of another embodiment of the present invention using average signals.

The flow chart for this method is illustrated in FIG. 5. The tool is lowered into a substantially homogenous interval 201. The $H_{xx}$ and $H_{xy}$ measurements are made at a plurality of rotational angles as the tool rotates 203. The $H_{xy}$ measurements correspond to measurements made with a first receiver antenna and the $H_{xx}$ measurements corresponds to measurements made with a second receiver antenna. The measurements are averaged and the misalignment angle estimated 205. In one embodiment of the invention, the measurements are made at uniformly spaced angles and a simple averaging can be done. In another embodiment of the invention, the measurements may be made with non-uniform rotational angles and an appropriate averaging procedure may be used. The estimated bias provides and estimate of the misalignment angle may then be used to correct the measurements 207 made in other portions of the wellbore using eqn. (1) and a parameter of interest of the earth formation estimated.

Another embodiment of the present invention uses an inversion of 3DEX data to obtain horizontal resistivity, vertical resistivity, and formation dip and azimuth, and requires the use of multi-component measurements including the three primary components (XX,YY,ZZ) plus at least one cross-component (XY or XZ). A method for simultaneous determination of formation angles and anisotropic resistivity using multi-component induction logging data is disclosed in U.S. Pat. No. 6,643,589 to Zhang et al., having the same assignee as the present invention and the contents of which are incorporated herein by reference. The inversion is performed using a gradient technique such as a generalized Marquardt-Levenberg method. In this generalized Marquardt-Levenberg method, a data objective function is defined that is related to a difference between the model output and the measured data. The iterative procedure involves reducing a global objective function that is the sum of the data objective function and a model objective function related to changes in the model in successive iterations. In an alternate embodiment of the invention, the formation azimuth angle is excluded from the iterative process by using derived relations between the multicomponent measurements. The gradient technique is part of a class of techniques collectively referred to as search techniques.

When multi-array induction measurements are also available, an inversion method is described in U.S. Pat. No. 6,885,947 to Xiao et al., having the same assignee as the present invention and the contents of which are incorporated herein by reference. Data are acquired using a multi-array logging tool in a borehole having an angle of inclination to a normal to the bedding plane of earth formations. The multi-array measurements are filtered using angle dependent filters to give a filtered curve corresponding to a target one of the multi-array measurements using angle-dependent filters. Correlation coefficients are estimated for a set of possible dip angles and a relative dip angle is estimated from the correlation coefficients. This dip angle estimate together with bed boundaries obtained from the multi-array measurements are used for inverting multi-component measurements alone or jointly with multi-array measurements to refine the relative dip angle interpretation and give horizontal and vertical formation resistivity.

Yet another inversion method using a separation of modes is disclosed in U.S. Pat. No. 6,636,045 to Tabarovsky et al having the same assignee as the present invention and the contents of which are incorporated herein by reference. In Tabarovsky, a combination of principal component measurements is used to estimate the horizontal resistivity of the earth formations. The estimated horizontal resistivities are used in a model for inversion of other components of the data to obtain the vertical formations resistivities. Tabarovsky further uses multifrequency focusing when multifrequency measurements are available.

Another inversion method is described in U.S. patent application Ser. No. 10/867,619 of Tabarovsky et al, having the same assignee as the present invention and the contents of which are incorporated herein by reference. In one embodiment of the Tabarovsky '619, using known values of the relative dip angle and azimuth, the focused measurements are separated into two or more fundamental modes. One of the fundamental modes is related primarily to the horizontal conductivity (or resistivity) of the earth formation, so that the horizontal conductivity may be obtained from the first mode. Using the estimated horizontal conductivity and the second mode, the vertical conductivity may be estimated. In another embodiment of the invention, the fundamental modes and the relative dip angle and azimuth are estimated simultaneously using measurements made at a plurality of depths. The simultaneous determination is done by searching over a range of relative dip angles and azimuths. Alternatively, the search may be done over a range of absolute dips and azimuths and using measurements made by orientation and navigation sensors on the tool.

One embodiment of the present invention uses an inversion technique such as that described in Zhang et al., Xiao et al., Tabarovsky et al., or any other suitable inversion method. A common characteristic of all of the methods is that a more stable and unique solution for formation dip and azimuth is estimated when both cross-components are included. However, if the cross-components are perfectly aligned, the same solution for formation dip and azimuth should be achieved if either the XY or the XZ components are omitted. If the XY component is in error due to misalignment, this will not be true.

The inversion technique to check for misalignment initially inverts the data with a particular cross-component such as the XY component omitted. Forward modeling is then used with these results to generate a simulated (expected)

XY response. The average difference between the simulated and actual XY responses should be zero. Any difference is attributed to misalignment.

To apply the technique, the average XX and XY responses are estimated over the entire logging interval along with the average simulated XY response obtained by forward modeling from the inversion performed without the XY measurement. Based on the eqn. (1) and the assumption that the simulated XY response represents $H_{XYtrue}$, the misalignment angle may be computed using average responses.

$$\overline{H}_{xy'}^{measured} - \overline{H}_{xy'}^{simulated} = \overline{H}_{xx} \sin \alpha$$

where the overbar represents and averaging. This technique also assumes that the misalignment is not changing and will not compensate for twisting and bending while logging unless the effect remains consistent. Once the correction is estimated and applied, a new inversion of the multi-component measurements may be carried out using all the available components.

Figure 6:
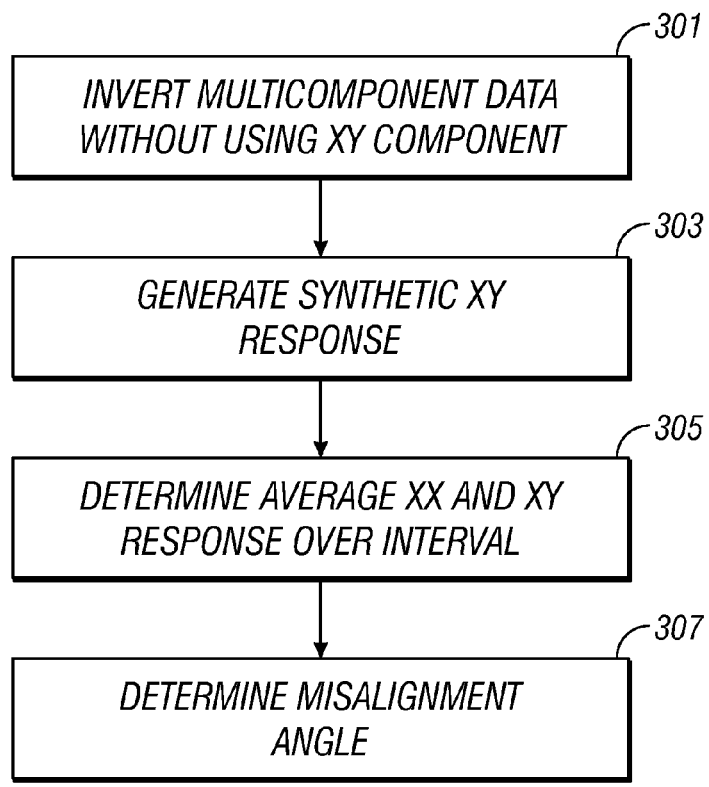
FIG. 6 shows a flow chart of an embodiment of the present invention using inversion.

FIG. 6 is a flow chart of this method. Multicomponent measurements (optionally with multiarray measurements) are acquired and the measurements are inverted without using the XY component 301. Simulated XY measurements are generated for the model 305. The XX and XY measurements are averaged over the interval 305. Next, the misalignment angles is estimated 307 as discussed above.

Implicit in the control and processing of the data is the use of a computer program on a suitable machine-readable medium that enables the processor to perform the control and processing. The machine-readable medium may include ROMs, EPROMs, EAROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

The following definitions are helpful in understanding the scope of the invention:

alignment: the proper positioning or state of adjustment of parts in relation to each other;

calibrate: to standardize by determining the deviation from a standard so as to ascertain the proper correction factors;

coil: one or more turns, possibly circular or cylindrical, of a current-carrying conductor capable of producing a magnetic field;

EAROM: electrically alterable ROM;

EPROM: erasable programmable ROM;

flash memory: a nonvolatile memory that is rewritable;

machin-readable medium: something on which information may be stored in a form that can be understood by a computer or a processor;

misalignment: the condition of being out of line or improperly adjusted; for the cross-component, this is measured by a deviation from orthogonality;

Optical disk: a disc-shaped medium in which optical methods are used for storing and retrieving information;

Position: an act of placing or arranging; the point or area occupied by a physical object Quadrature: 90° out of phase; and ROM: Read-only memory.

What is claimed is:

1. A method of estimating a parameter of interest of an earth formation, the method comprising:
   (a) conveying a logging tool into a borehole in the earth formation;
   (b) obtaining a plurality of multi-component resistivity measurements using the logging tool;
   (c) inverting the multi-component resistivity measurements without using a particular cross-component to give a resistivity model at a plurality of depths;
   (d) using the resistivity model to provide a simulated value of the particular cross-component; and
   (e) using the simulated value of the particular cross-component and an actual value of the particular cross-component for estimating a misalignment angle in the logging tool.

2. The method of claim 1 wherein inverting the multi-component measurements further comprises using a search technique.

3. The method of claim 1 further comprising obtaining multi-array induction measurements and using the multi-array induction measurements in the inversion.

4. The method of claim 1 wherein inverting the multi-component measurements further comprises:
   (i) using a first subset of the measurements to estimate a horizontal resistivity of the formation, and
   (ii) using the estimated horizontal resistivity and another subset of the measurements to estimate a vertical resistivity of the earth formation.

5. The method of claim 1 wherein inverting the multi-component measurements further comprises using a separation of modes.

6. The method of claim 1 wherein the particular cross-component is selected from (i) an XY component, and (ii) an XZ component.

7. The method of claim 1 wherein determining the misalignment angle further comprises using an average value of the particular cross-component and an average simulated value of the particular cross-component.

8. The method of claim 1 further comprising using the misalignment angle and the multi-component measurements to estimate the parameter of interest of the earth formation.

9. The method of claim 8 wherein the parameter of interest is at least one of (i) a horizontal conductivity, (ii) a vertical conductivity, (iii) a horizontal resistivity, (iv) a vertical resistivity, (v) a relative dip angle, (vi) a strike angle, (vii) a sand fraction, (viii) a shale fraction, and (ix) a water saturation.

10. An apparatus for estimating a parameter of interest of an earth formation, the apparatus comprising:
   (a) a logging tool conveyed into a borehole in the earth formation which obtains a plurality of multi-component resistivity measurements; and
   (b) a processor which:
      (A) inverts the multi-component resistivity measurements without using a particular cross-component to give a resistivity model at a plurality of depths;
      (B) uses the resistivity model to provide a simulated value of the particular cross-component; and
      (C) uses the simulated value of the particular cross-component and an actual value of the particular cross-component to estimate a misalignment angle in the logging tool.

11. The apparatus of claim 10 wherein the processor inverts the multi-component measurements using a search technique.

12. The apparatus of claim 10 wherein the processor inverts the multi-component measurements using:
   (i) a first subset of the measurements to estimate a horizontal resistivity of the formation, and (ii) the estimated horizontal resistivity and another subset of the measurements to estimate a vertical resistivity of the earth formation.

13. The apparatus of claim 10 wherein the processor inverts the multi-component measurements by using a separation of modes.

14. The apparatus of claim 10 wherein the particular cross-component is selected from (i) an XY component, and (ii) an XZ component.

15. The apparatus of claim 10 wherein the processor estimates the misalignment using an average value of the particular cross-component and an average simulated value of the particular cross-component.

16. The apparatus of claim 10 wherein the processor further uses the estimated misalignment angle and the multi-component measurements to estimate the parameter of interest of the earth formation.

17. The apparatus of claim 16 wherein the parameter of interest is at least one of (i) a horizontal conductivity, (ii) a vertical conductivity, (iii) a horizontal resistivity, (iv) a vertical resistivity, (v) a relative dip angle, (vi) a strike angle, (vii) a sand fraction, (viii) a shale fraction, and (ix) a water saturation.

18. The apparatus of claim 10 further comprising a wireline which conveys the logging tool into the borehole.

19. The apparatus of claim 18 further comprising a motor which rotates the logging tool to the plurality of rotational angles.

20. The apparatus of 10 wherein the logging tool is part of a bottomhole assembly (BHA) conveyed into the borehole on a drilling tubular.

21. A computer readable medium used with an apparatus for evaluating an earth formation, the apparatus comprising:
    (a) a logging tool conveyed into a borehole in the earth formation which obtains a plurality of multi-component resistivity measurements;
    the medium comprising instructions which enable a processor to
    (b) invert the multi-component resistivity measurements without using a particular cross-component to give a resistivity model at a plurality of depths;
    (c) use the resistivity model to provide a simulated value of the particular cross-component; and
    (d) estimate a misalignment angle in the logging tool by using the simulated value of the particular cross-component and an actual value of the particular cross-component.

22. The medium of claim 20 further comprising at least one of (i) a ROM, (ii) an EPROM, (iii) an EAROMs, (iv) a flash memory, and (v) an Optical disk.

* * * * *